United States Patent Office 3,475,280
Patented Oct. 28, 1969

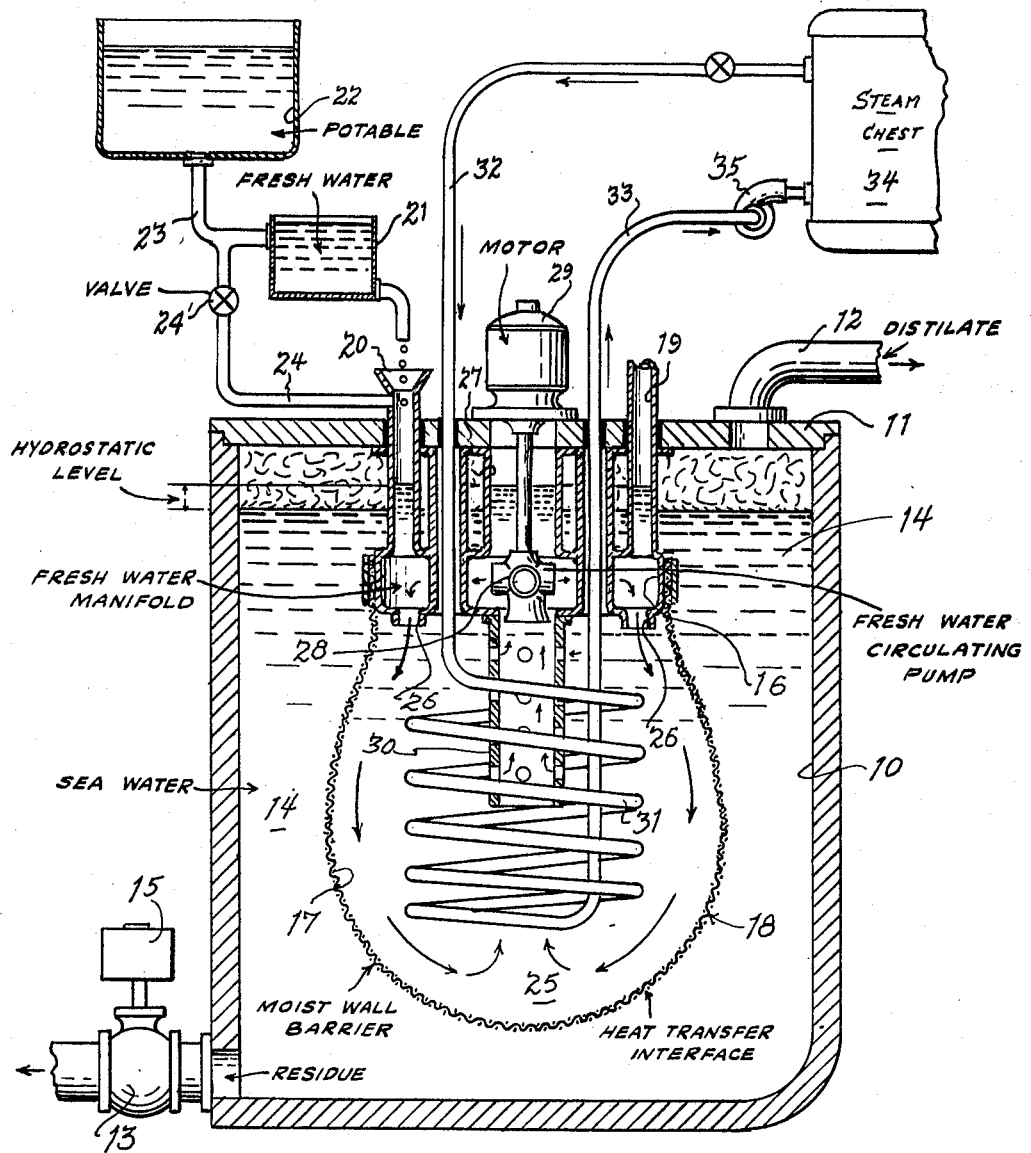

3,475,280
SEA WATER DESALINATION APPARATUS
Carl A. Oding, 4809 Reinhardt Drive,
Oakland, Calif. 94619
Filed Jan. 18, 1966, Ser. No. 521,316
Int. Cl. B01d 3/00; F28d 15/00
U.S. Cl. 202—233
8 Claims

ABSTRACT OF THE DISCLOSURE

The invention relates generally to liquid evaporating systems employing steam coils and like means for supplying the heat of evaporation and more particularly to a means for overcoming the difficulties encountered in such systems due to the formation of scale on the heat transfer surfaces of the heating unit. In accordance with the invention the primary heating unit of such a system is shown as immersed in a potable or non-scaling liquid that is confined within a wall of a non-metallic scale rejecting material and which forms a heat transferring and scale rejecting barrier or interface through which the heat of evaporation is transferred from the heated non-scaling liquid to the liquid undergoing evaporation.

---

My present invention relates to apparatus for the desalination of sea water and/or purification of contaminated and other non-potable aqueous solutions.

A primary object is the provision of an improvement in the heat transfer means for evaporation apparatus as are now being proposed and constructed in various parts of the world for the desalination of sea water and other non-potable aqueous solutions such as brackish mineral bearing water, sewage, treatment plant effluent, mineral and chemically charged mine waters, water bearing industrial wastes and insecticide and detergent polluted agricultural waste.

Another object of the invention is to provide an improved submersible heat transfer means which will efficiently function to transfer heat from a suitable source to the liquid under treatment in the presence of high concentrations of scale producing and other mineral bearing aqueous liquid from which it is desired to extract a substantial portion of the potable water contained therein.

A further object to the invention is to provide a heat transfer means with a thermal barrier surface that will operate substantially free of scale or corrosion such as is now found to interfere with the efficient transfer of heat from a suitable source to the liquid undergoing evaporation.

There are many known methods and processes for the production of potable fresh water from sea water and other non-potable waters by evaporation as in present day thermal distillation plants having heat energy transfer means in the form of conventional tubular and shell type heat exchange units with condensers as are well known in the art. These systems, however, have not found full acceptance due to the costs involved and as a result great efforts are now being made to develop distillation processes and apparatus that will produce fresh potable water at substantially lower costs per thousand gallons than is currently possible. The difficulty found in these prior processes is due to the fact that the heat exchange means employed is required to function in the presence of corroding and scale forming minerals present in the water to be converted which impair the heat transfer means and when this condition is not counteracted by suitable means these corrosive and scale forming elements constitutes a major cost problem in present day processes. It is, therefore, a further object of my invention to provide a heat transfer means which will remain free of scale and the like and function efficiently in the presence of high concentrations of brine and/or other corroding and scale forming minerals found in the aqueous liquid from which it is desired to extract by evaporation a substantial portion of the potable water contained in such liquid.

In accordance with my invention I employ a heat exchanging element having a moist wall thermal barrier that may find many uses particularly where the process involves the evaporation of a liquid substance by the application of heat. However, for the purpose of this disclosure, the heat exchanger with the moist wall barrier is illustrated and described in connection with apparatus for the distillation of sea water in which the heat of evaporation is applied through a mineral free potable liquid confined within a chamber having my so-called moist wall barrier or external surface immersed in and/or exposed to the sea water or other contaminated liquid to be purified. In essence the invention may be considered to reside in the provision of a non scaling and corrosion free heat transferring barrier between a heat supplying liquid and a liquid that is to be evaporated by the application of such heat and wherein the thermal heat transferring barrier is substantially impervious to the flow of sea water or other contaminating liquid while being at the same time sufficiently pervious to the flow of mineral free water to maintain a film of uncontaminated water over its exposed contaminated liquid or sea water engaging surface.

The single figure of the drawing is a diagrammatic illustration of a device embodying the invention.

For a more detailed description and better understanding of the invention, reference is now made to the accompanying drawing wherein there is shown by way of illustration and not of limitation an embodiment of the invention wherein my improved heat exchange apparatus with its moist wall thermal heat transfer barrier is employed in an apparatus suitable for the desalination of sea water.

In the drawing, the numeral 10 designates a suitable vat, tank or other suitable sea water accommodating means having a sealed cover or closure means 11 with a steam or liquid vapor exhaust outlet 12. At the bottom of the vat or tank 10 there is a valve 13 for controlling the discharge of sludge and/or scale such as results from the evaporation of sea water 14 as contained in the tank or vat 10. The valve 13 may be manually controlled or it may have a well known control unit 15 that is responsive to the amount of sludge and/or foreign matter which is precipitated during the sea water desalination process. The top closure or cover 11 of the tank 10 is hermetically sealed, and suspended therefrom and immersed in the sea water 14 there is a fresh water or potable liquid distributing manifold 16 through which potable water or a mineral free liquid is introduced to a sack-like member 17 which is formed of synthetic fibers or other suitable material to provide a non-scaling sea water engaging heat transfer surface or interface 18. This sack-like member 17 is clamped by suitable means at its upper open end to the liquid distributing manifold 16. The interior of this manifold 16 has an upstanding air vent 19 and also a stand pipe 20 through which fresh potable water is introduced at a regulated rate from a supply tank 21 that is in turn supplied through a pipe connection 23 with potable or mineral free water or condensate from a reservoir 22. For a manual control or a rapid filling of the sack-like member 17, there is a further pipe or by-pass connection 24 with a valve 24.

In this manner the level of the potable water, here designated by the numeral 25, contained in the sack-like member 17, may be maintained substantially in equilibrium with level of the sea water 14 in the tank 10. The manifold member 17 has downwardly extending ports 26 through which the potable water is introduced into the interior of the sack-like member 17. As shown, the level of the potable water 25 in the sack-like member 17 will be maintained slightly higher than that of the level of the salt water 14 in the tank 10, to compensate for the difference in the density of the potable water 25 and the sea water 14. As a result the pressure exerted on the opposite sides of the sack-like member 17 will be slightly out of hydrostatic balance with a predominating pressure in favor of the potable water 25. The manifold member 16 also has a central vertically extending cylindrical portion 27 within which a retractable liquid circulating pump 28 driven by a motor 29 is positioned and extending downwardly from the intake of the pump 28 there is a cylindrical intake portion 30 having an open end and radially spaced apertures through which the potable water 25 in the sack-like member 17 may circulate when the pump 28 is in operation.

As a primary source of heat the sack-like member 17 is shown as enclosing a heat exchange unit 31 in the form of a steam coil that is connected through steam conduits 32 and 33 with a steam chest 34 or other similar source of vaporized heat. To maintain a circulation of steam through the primary heat exchange coil 31, I have shown a suitable pump 35 as located in the steam return conduit 33. At this point, while steam is here referred to as the source of heat for the primary heat exchange unit or coil 31 it will be understood that vaporized mercury from a mercury boiler may be used. In fact it is contemplated that a source of electric power with connections to a submersible heat transfer unit of a character well known in the art may be employed.

When the apparatus is in operation, it will be understood that the potable water 25 contained within the sack-like member 17 will transfer the heat introduced by the steam coil 31 to the wall of the sack-like member 17 where this heat will be finally transmitted by conduction through the wall-like barrier or interface 18 formed as above described between the fresh potable water 25 within the sack-like member 17 and salt water 14 undergoing desalination as contained in the tank or vat 10. As the temperature of the sea water 14 or other liquid is raised to the proper temperature the vapors resulting from this evaporating step will accumulate above the level of the sea water 14 and under the cover 11 which except for the vapor exhaust conduit 12 will be sealed over the top of the tank or vat 10.

The above described apparatus except for the sack-like member 17 with its potable water enclosing and heat transfer feature may be compared with a present day conventional installation involving the submersion of a tubular or shell type heat exchange unit within the sea water or other liquid to be subjected to the evaporation process. These prior installations, involving as they do the direct application of heat from a metallic tubular or shell type heat exchange unit, are open to the fault that scale and other mineral deposits accumulate upon the exposed surfaces of the heat exchange unit and form a heat insulating barrier against the transmission of heat from the heat transfer unit to the sea water in which their surfaces are exposed. Therefore since the purpose of the present invention is to overcome this scale forming difficulty, I have by my invention provided a means wherein the primary heat exchange unit which may take any form is submerged and enclosed within a non-scaling potable water or other liquid through which the heat from the primary heat supplying unit is transmitted to the heat transfer surface forming barrier or interface 18 formed between the potable water 25 within the sack-like member 17 and the exterior sea water 14 or other liquid to be evaporated. The moist wall barrier or interface 18 of this arrangement is not to be confused with the membrane as now employed in the so-called reverse-osmosis process such as is currently being applied experimentally in the sea water desalination art. In accordance with my invention, instead of an osmotic action at the barrier or interface 18 the potable fresh water 25 within the sack-like member 17 is subjected to a slightly predominating pressure which will ensure a flow of fresh water outwardly preferably at no greater rate than will serve to provide a moist wall or thin film of fresh water about the outer surface of the sack-like member 17. In order that the material forming the sack-like member 17 be of a non-scaling or sludge and slime accumulating character, it is proposed that this sack-like member 17 be formed of suitable woven fibers which as indicated will form a substantially water-tight barrier between its contained mineral free or potable water 25 and the sea water 14 or other contaminated liquid undergoing evaporation. Such a material in addition to being capable of withstanding the operating temperatures involved would also have a relatively long active life. As suitable synthetic fibers may be mentioned "Teflon," "Nylon" and a more recently developed "Nomax" a nylon fiber recently developed by the Dupont Co. which has high temperature resistant qualities and is unaffected by high humidity and has a highbreaking strength at these high temperatures. It is also conceivable that the material forming the sack-like member 17 may be of other construction as for example of unwoven construction having the required heat conducting characteristics required to operate at the sea water boiling or evaporation temperatures required, such as a sintered material.

In a practical operation of the moist wall heat transfer system the hydrostatic level of the heat bearing mineral free liquid 25 within the sack-like member 17 is maintained at a sufficiently higher level than the surrounding mineral bearing liquid 14 which is being evaporated. As a result a minor but positive flow of the mineral free heat bearing liquid 25 will seep through extremely slightly open passages in the fabric forming the moist wall barrier 17. This mineral free liquid 25 even at a very minor rate of flow will then effectively maintain a surface of the mineral free liquid 25 on the outside surface or interface 18 formed by the sack-like member 17 and the presence of this thin film of mineral free liquid will operate to transmit the molecular heat from the liquid 25 directly into the mineral bearing liquid and also serve two further purposes:

First, it will separate the surface of the moist wall barrier 18 from direct contact with the mineral bearing liquid 14 being evaporated, and secondly, under the influence of the hydrostatic differential pressure, it will flow or ooze through the moist wall barrier and come into direct contact with the sea water being evaporated and this will produce and maintain a scale free surface for the transmission of heat energy into the liquid being evaporated. This action provides a true heat exchange interface which is the basic principle of heat exchange as contemplated by my invention.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In an evaporating system for the desalination of sea water and purification of like liquids having scale depositing characteristic when heated, the combination of a container means for holding to a liquid subject evaporation, a primary heat transfer means for heating the liquid in said container means, plastic means forming an enclosure about said primary heat transfer means, a body of non-scaling heat transmitting liquid within said enclosure into which said primary heat transfer unit is submerged, said enclosure means forming a barrier wall of heat transmitting construction and providing an non-scaling heat conducting interface between said body of non-scaling heat transmitting liquid within said enclosure means and the liquid under evaporation carried by said container means.

2. The invention as set forth in claim 1, characterized by the fact that said closure forming means consists of a woven non-scale supporting material in the form of tightly woven non metallic scale rejecting fibers.

3. In an evaporating system for the desalination of sea water having scale forming minerals and other heat transfer inhibiting substances which at present accumulate upon the exposed surface of immersible type heat transfer units, the combination of a container in which sea water to be treated is supported having an exhaust outlet for the escape of potable water vapors, a heat transfer means submerged within the sea water carried by said container, said heat transfer means consisting of a primary heat transfer unit surrounded by a heat conducting liquid, means forming a plastic enclosure for said heat conducting liquid and providing a heat transmitting and non-scaling barrier between said heat conducting liquid and the sea water when submerged therein, said enclosure forming means consisting of a woven fabric member only slightly pervious to the flow of heat conducting liquid and substantially impervious to the flow of sea water, whereby a non-scaling heat transferring interface is formed between the heat transfer means and the sea water carried by said container.

4. In a heat transfer system for evaporation purposes, the combination of a container in which a liquid to be evaporated is supported having an exhaust outlet for the escape of liquid vapors, a liquid containing member having a horizontally extending circular manifold with a depending vertical extension and vents extending upwardly therefrom, a plastic sack-like member of woven non-scale supporting material suspended from said liquid containing member, a body of non-scale forming liquid dispersed within sack-like member, means for maintaining an operating hydrostatic level of the non-scale forming liquid within sack-like member above that of the sea water in said container, a liquid circulating means for maintaining circulation of the non-scaling liquid within said sack-like member, and a primary heat transfer means submerged within said non-scale forming liquid having connection with a suitable source of heat.

5. In an evaporating system for the desalination of sea water and purification of like liquid having scale forming and heat transfer inhibiting substances, the combination of means for holding a liquid to be subjected to evaporation, a primary heat transfer unit for delivering heat to the liquid in said means, and plastic enclosure means forming a barrier of non-scaling heat transmitting liquid between said primary heat transfer unit and a body of the liquid to be evaporated into which said primary heat transfer unit is submerged, said enclosure means forming a moist wall with a non-scaling heat conducting interface between said non-scaling heat transmitting liquid within said barrier forming means and the liquid under evaporation as carried by said container means.

6. In an evaporating system for the desalination of sea water having scale forming minerals and other heat transfer inhibiting substances which at present accumulate upon the exposed surface of submersible type heat transfer units, the combination of a container in which sea water to be treated is supported having an exhaust outlet for the escape of potable water vapors, a heat transfer means submerged within the sea water carried by said container, said heat transfer means consisting of a primary heat source surrounded by non-scale forming liquid and means forming a barrier between said non-scale forming liquid and the sea water when submerged therein, said barrier forming means consisting of a woven plastic structure only slightly pervious to the flow of the non-scale forming liquid and substantially impervious to the flow of sea water, whereby a non-scaling heat transferring interface will be formed between the non-scaling liquid within said barrier forming means and the sea water carried by said container.

7. In a heat transfer system for evaporation purposes, the combination of a closed container, a plastic non-scaling barrier having a non-scaling liquid heat transfer medium therewith located within said container, heating means located within said barrier, a liquid agitating means for agitating the heat transfer medium, means for removing vapors from the container, means to maintain a pressure differential between the inside and outside of said plastic carrier, vent means located within said barrier, a source of heat transfer liquid for supplying heat transfer medium, and means for removing the unevaporated material from the closed container.

8. In a heat transfer system for evaporation purposes, the combination of an evaporator in which a body of liquid to be evaporated is supported, a vapor disposal means connected to said container, a manifold with a depending liquid outlet and upwardly extending vents, an enclosure member of woven non-scale supporting material carried by said manifold, a body of non-scale forming liquid disposed within said enclosure member, means for maintaining a higher operating hydrostatic level of the non-scale forming liquid within said enclosure member and the liquid in said container and a primary heat transfer means submerged within said non-scale forming liquid.

References Cited
UNITED STATES PATENTS

| | | |
|---|---|---|
| 1,325,199 | 12/1919 | Jewell _____ 202—234 |
| 2,833,644 | 5/1958 | Avery _____ 203—100 XR |
| 3,060,119 | 10/1962 | Carpenter. |
| 3,161,574 | 12/1964 | Elam _____ 202—236 |
| 3,205,588 | 9/1965 | Oetjen et al _____ 55—315 XR |
| 550,628 | 12/1895 | Lester _____ 202—235 XR |
| 664,015 | 12/1900 | Denaeyer _____ 202—235 |

NORMAN YUDKOFF, Primary Examiner

D. EDWARDS, Assistant Examiner

U.S. Cl. X.R.

165—46, 107; 203—7, 100

UNITED STATES PATENT OFFICE
CERTIFICATE OF CORRECTION

Patent No. 3,475,280 October 28, 1969

Carl A. Oding

It is certified that error appears in the above identified patent and that said Letters Patent are hereby corrected as shown below:

Column 4, line 70, cancel "to" and insert the same after "subject" in same line 70, column 4.

Signed and sealed this 27th day of October 1970.

(SEAL)
Attest:

Edward M. Fletcher, Jr.  
Attesting Officer

WILLIAM E. SCHUYLER, JR  
Commissioner of Patents